United States Patent
Ke

(10) Patent No.: US 8,037,292 B2
(45) Date of Patent: Oct. 11, 2011

(54) METHOD FOR ACCELERATING BIOS RUNNING

(75) Inventor: Haibin Ke, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 1068 days.

(21) Appl. No.: 11/769,174

(22) Filed: Jun. 27, 2007

(65) Prior Publication Data

US 2008/0005549 A1    Jan. 3, 2008

(30) Foreign Application Priority Data

Jun. 30, 2006  (CN) .......................... 2006 1 0090794

(51) Int. Cl.
  G06F 15/177    (2006.01)
  G06F 9/24      (2006.01)
(52) U.S. Cl. .................. 713/2; 713/1; 713/100; 711/118
(58) Field of Classification Search .................. 713/1, 2, 713/100; 711/118
  See application file for complete search history.

(56) References Cited

U.S. PATENT DOCUMENTS

| | | | | |
|---|---|---|---|---|
| 5,410,711 A | * | 4/1995 | Stewart | 713/322 |
| 2003/0188173 A1 | * | 10/2003 | Zimmer et al. | 713/189 |
| 2004/0098575 A1 | * | 5/2004 | Datta et al. | 713/2 |
| 2004/0103272 A1 | * | 5/2004 | Zimmer et al. | 713/1 |
| 2005/0015582 A1 | * | 1/2005 | Shida et al. | 713/2 |
| 2007/0055856 A1 | * | 3/2007 | Zimmer et al. | 713/2 |

FOREIGN PATENT DOCUMENTS

| | | |
|---|---|---|
| JP | 62-98443 | 10/1985 |
| JP | 11-316687 | 2/1999 |
| JP | 2003-248580 | 2/2002 |
| JP | 2004-295397 | 3/2003 |

OTHER PUBLICATIONS

Interface Supplement—X86 Assembly Introduction, vol. 31, published Jan. 1, 2006 (Japan).
Windows 95—System Program Development, Microsoft Press, published Oct. 11, 1997 (Japan).

* cited by examiner

Primary Examiner — Thomas Lee
Assistant Examiner — Fahmida Rahman
(74) Attorney, Agent, or Firm — Hunton & Williams LLP

(57) ABSTRACT

The present invention provides a method for accelerating the BIOS running by means of Cache-As-RAM, comprising steps of: a CPU reading a first instruction from a BIOS Flash ROM and beginning to run BIOS programs after a computer is powered on; the CPU turning on a No-Eviction Mode (NEM) of a cache and initializing a Cache-As-RAM (CAR); the CPU copying the BIOS programs to the CAR space from the BIOS Flash ROM and running the BIOS programs completely in the CAR space; at the end of running the BIOS programs in the CAR space, the CPU initializing a system memory; after the system memory is initialized, the CPU again reading the BIOS programs from the Flash ROM; the CPU copying the BIOS program modules that have not been run yet to the system memory from the BIOS Flash ROM; and the CPU running the BIOS programs from the system memory, so as to finish the initialization of the computer platform.

5 Claims, 1 Drawing Sheet

METHOD FOR ACCELERATING BIOS RUNNING

BACKGROUND OF THE INVENTION

1. Field of the Invention

The present application relates to the computer field, and more specifically, to a method for accelerating the BIOS running by means of Cache as RAM (CAR).

2. Description of Prior Art

When an existing computer system is powered on, a CPU reads a first instruction from a BIOS Flash ROM through a low speed bus, for example, ISA, LPC, FWH and so on, and begins to run the BIOS. After performing some simple power-on initializations on the CPU, chip sets and peripheral devices, the BIOS starts to initialize a memory. The CPU doesn't copy the BIOS main programs from the Flash ROM to the system memory until the initialization of the memory is completed. Then, the CPU reads instructions from the memory, so as to improve the running speed of the BIOS.

A method for improving the accessing speed to the memory by mapping the memory areas used by running of the BIOS programs with the CPU cache so as to accelerate the running of the BIOS programs is proposed in Chinese Patent Applications No. CN 03156907.2 and Chinese Patent No. CN 1641580.

A method for accelerating the BIOS running is proposed in the Chinese Patent Applications CN 03156907.2 and Chinese Patent No. CN 1641580. This method maps the memory areas used by the BIOS programs with the CPU cache. When running the BIOS programs, in the case of "Cache Hit", the CPU reads BIOS instructions directly from the cache without reading them from the system memory, thus the running of the BIOS programs is accelerated.

A method for accelerating the running of an option ROM for an add-in card is proposed in US Patent Application No. US 2003/023812, wherein when the BIOS is to run the option ROM for a certain add-in card, it copies the option ROM to the system memory, and then maps this memory area with the CPU cache, so as to accelerate the running of the option ROM.

The above methods are encountered with following disadvantages:

1) These schemes cannot be applied until the system memory is available. However, at the initial stage of the BIOS running, the system memory is not available, and therefore, the above schemes cannot be applied.

2) Even though the above schemes are applied, it is not always the case of "Cache Hit" when the CPU reads the BIOS programs, where the CPU still needs to read the BIOS programs from the system memory.

In order to overcome the above problems so as to accelerate the BIOS running, the present invention provides a method, in which the CPU cache is set as RAM (random access memory) for use. Thus, even when the system memory is not available, the BIOS can be run in this section of RAM space, resulting in the greatly accelerated running of the BIOS.

SUMMARY OF THE INVENTION

There exists a new added cache attribute NEM (No-Eviction Mode) in new types of CPU such as Prescott, Nocona from Intel. This attribute allows a program to set a CPU cache as a section of RAM space for use, which is so called CAR (Cache-as-RAM). By means of the NEM attribute, after a computer is powered on, BIOS turns on the CAR function of the cache by initializing relevant registers of the CPU. Then, BIOS programs are copied from a Flash ROM to the CPU cache and BIOS instructions are read directly form the cache. A system memory is not initialized until the running of most of the BIOS programs is completed. After the system memory is initialized, the CAR function is turned off by setting the relevant registers of the CPU. Then, the CPU reads the BIOS instructions from the system memory so as to complete all of the BIOS programs.

Therefore, according to the present invention, a method for accelerating the BIOS running by means of Cache-As-RAM is provided, which comprises steps of: a CPU reading a first instruction from a BIOS Flash ROM and beginning to run BIOS programs; the CPU turning on a No-Eviction Mode (NEM) of a cache and initializing a Cache-As-RAM (CAR); the CPU copying the BIOS programs to the CAR space from the BIOS Flash ROM and running the BIOS programs completely in the CAR space; at the end of running the BIOS programs in the CAR space, the CPU initializing a system memory; after the system memory is initialized, the CPU again reading the BIOS programs from the Flash ROM; before the system memory is used, the BIOS turning off the NEM mode of the cache, turning off the CAR function, and restoring the cache to the default state; the CPU copying the BIOS program modules that have not been run yet to the system memory from the BIOS Flash ROM; and the CPU running the BIOS programs from the system memory, so as to finish the initialization of the computer platform.

The present invention has the following advantages over the prior art.

(1) According to the present invention, the CPU cache is set as a RAM for use at the initial stage of the BIOS running, and then the BIOS programs are copied to this section of RAM space. Therefore, even when the system memory is not available, there is no need for the CPU to fetch BIOS instructions one by one through a low speed bus.

(2) According to the present invention, after the BIOS programs are copied to the cache, the CPU runs the BIOS programs completely from the cache. Since there is no case of failure "Cache Hit", the speed is greatly improved compared to the method of mapping the system memory with the cache.

BRIEF DESCRIPTION OF THE DRAWINGS

Hereinafter, the preferred embodiments of the present invention will be described with reference to the drawings, in which.

DETAILED DESCRIPTION OF PREFERRED EMBODIMENTS

Figure 1:
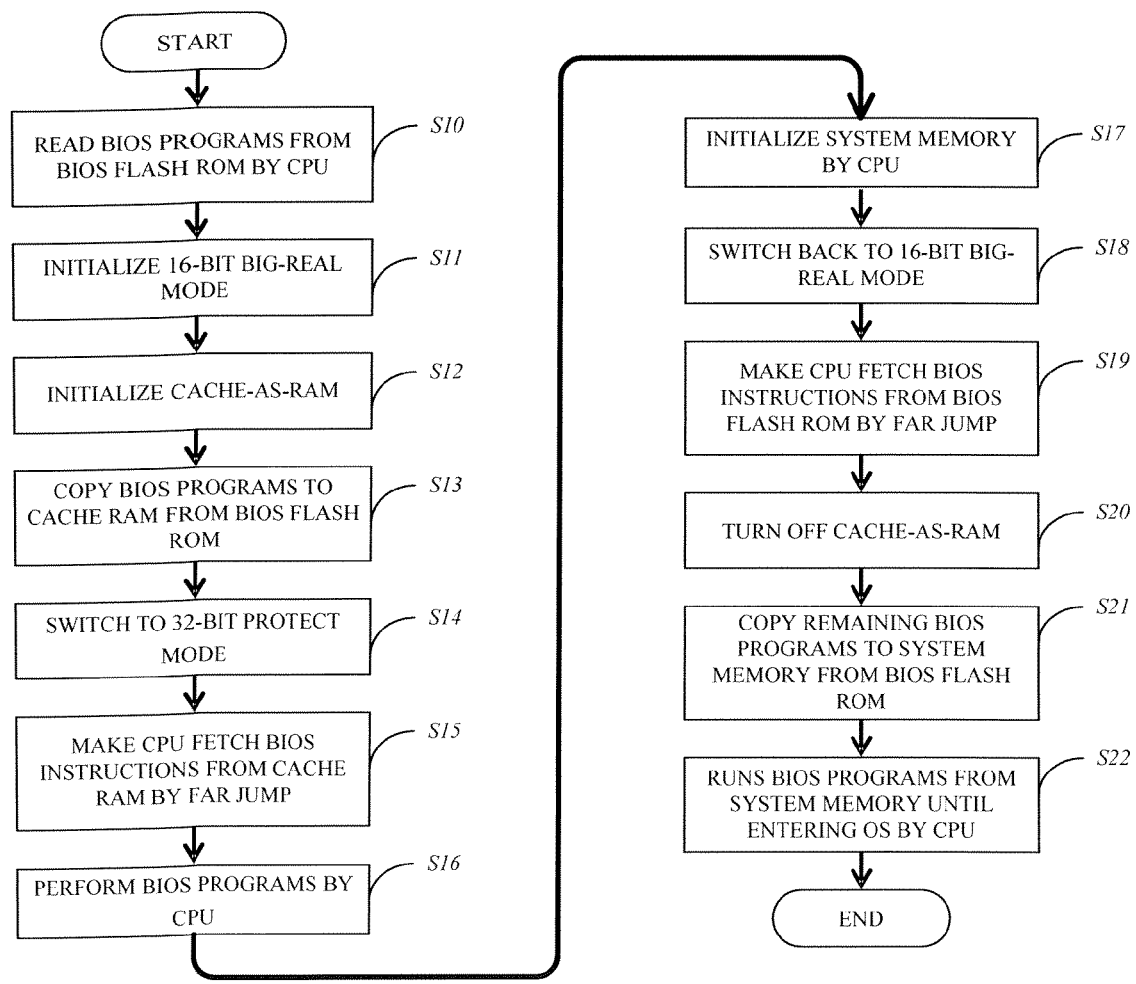
FIG. 1 is a flowchart of a method for accelerating the BIOS running by means of NEM according to the present invention.

The specific embodiments of the present invention are described hereinafter with reference to the drawings. It is to be noted that the embodiments are described only for illustrative purpose rather than limiting the scope of the present invention. The various numbers described here are not intended to limit the present invention, and appropriate amendments to these numbers can be made by those skilled in the art as desired.

FIG. 1 is a flowchart of a method for accelerating the BIOS running by means of NEM according to the present invention.

When a computer is powered on, a CPU is in a real mode state, and a default CS (code segment register):IP (instruction pointer) points to a BIOS Flash ROM. That is, after the system is powered on, the CPU reads a first instruction from the BIOS Flash ROM, and begins to run BIOS programs (S10).

The CPU initializes a 16-bit Big-Real mode (which is a 16-bit code/32-bit address mode), where register values of a DS (data segment register), an ES (extra segment register), a FS (flag segment register), a GS (global segment register) and a SS (stack segment register) are 0. The CPU is capable of addressing a memory space of 0-4 GB. However, fetch of the CPU is still in the 16-bit CS:IP mode (S11).

The CPU turns on an NEM (No-Eviction Mode) mode of a cache, initializes a Cache-As-RAM (CAR), and designates a base address for the CAR space. Thereafter, the operations on the CAR space are based on the base address (S12).

The CPU copies the BIOS programs from the BIOS Flash ROM to the CAR space, and sets an Entry through which the BIOS programs jump to the CAR from the Flash ROM and a Return Entry through which the BIOS programs return to the Flash ROM from the CAR (S13).

The CPU switches to a 32-bit protect mode, where the CPU is completely in the 32-bit mode regardless of fetching or addressing, which is so called USE32 mode, so that the CPU may run the BIOS programs from the CAR space (S14).

The CPU jumps to the program Entry to the CAR space from the Flash ROM by an instruction of "Far Jump". Thereafter, the CPU runs the BIOS programs completely in the CAR space (S15).

Running in the 32-bit protect mode, the CPU reads and runs the BIOS programs from the CAR space, and at the same time stores intermediate results of the running programs (S16).

At the end of running the BIOS programs in the CAR space, the CPU initializes a system memory (S17).

After the system memory is initialized, the CPU switches back to the 16-bit Big-Real mode (USE16 code/USE32 data), so as to escape from the CAR space (S18).

The CPU jumps to the Return Entry to the Flash ROM from the CAR again by the instruction of "Far Jump", so the CPU again reads the BIOS programs from the Flash Rom (S19).

Before using the system memory, the BIOS turns off the NEM mode of the cache, turns off the Cache-As-RAM function, and restores the cache to the default state (S20).

The CPU copies the BIOS modules that have not been run yet to the system memory from the BIOS Flash ROM (S21).

The CPU runs the BIOS programs from the system memory, instead of reading the BIOS instructions from the BIOS Flash ROM, again by means of the jump instruction. The CPU runs all of the BIOS programs from the system memory so as to finish the initialization of the computer platform and finally enter an OS or Shell environment (S22).

The embodiments described above are intended to illustrate while not limit the technical solution of the present invention. Although the present invention is described referring to the above embodiments, it is to be understood by those skilled in the art that modifications and equivalent replacements to the present invention are possible, and those modifications and partial replacements without departing from the spirit and scope of the present invention all fall into the scope of the appended claims.

What is claimed is:

1. A method for accelerating the BIOS running, comprising steps of:
   1) reading a first instruction from a BIOS Flash ROM and beginning to run BIOS program, by a CPU;
   2) turning on a No-Eviction Mode (NEM) of a cache and initializing a Cache-As-RAM (CAR), by the CPU;
   3) copying the BIOS program to the CAR space from the BIOS Flash ROM and running the copied BIOS program completely in the CAR space, by the CPU, wherein an entry through which the BIOS program space jumps to the CAR from the Flash ROM and a return entry through which the BIOS program returns to the space Flash ROM from the CAR are set;
   4) at the end of running the BIOS program in the CAR space, initializing a system memory by the CPU;
   5) after the system memory is initialized, again reading the BIOS program from the BIOS Flash ROM by the CPU;
   6) copying modules of the BIOS program that have not been run yet to the system memory from the BIOS Flash ROM by the CPU; and
   7) running the modules of the BIOS program from the system memory by the CPU, so as to finish the initialization of the computer, wherein the CPU reads the BIOS program from the BIOS Flash ROM in a 16-bit Big-Real mode, and the CPU reads and runs the BIOS program from the CAR space in a 32-bit protect mode.

2. The method according to claim 1, wherein the step of initializing the CAR comprises:
   designating abuse address for the CAR space, thereafter operations on the CAR space are based on the base address.

3. The method according to claim 1, wherein the step of running the BIOS program completely in the CAR space by the CPU comprises:
   jumping to the entry to the CAR space from the BIOS Flash ROM by running an instruction of "Far Jump".

4. The method according to claim 1, wherein the step of again reading the BIOS program from the BIOS Flash ROM by the CPU comprises:
   jumping to the return entry to the Flash ROM from the CAR space by the instruction of "Far Jump".

5. The method according to claim 1, wherein before the step 6), BIOS turns off the NEM mode of the cache, turns off the CAR function, and restores the cache to the default state.

* * * * *